(12) United States Patent
Deixler et al.

(10) Patent No.: US 12,510,965 B2
(45) Date of Patent: Dec. 30, 2025

(54) BRAIN CONTROL INTERFACE SYSTEM FOR CONTROLLING A CONTROLLABLE DEVICE

(71) Applicant: SIGNIFY HOLDING B.V., Eindhoven (NL)

(72) Inventors: Peter Deixler, Arlington, MA (US); Evren Özcan, Eindhoven (NL); Abhishek Murthy, Arlington, MA (US); Jérôme Eduard Maes, Eindhoven (NL); Daksha Yadav, Boston, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/729,917

(22) PCT Filed: Jan. 13, 2023

(86) PCT No.: PCT/EP2023/050724
§ 371 (c)(1),
(2) Date: Jul. 18, 2024

(87) PCT Pub. No.: WO2023/138992
PCT Pub. Date: Jul. 27, 2023

(65) Prior Publication Data
US 2025/0103136 A1 Mar. 27, 2025

Related U.S. Application Data

(60) Provisional application No. 63/300,753, filed on Jan. 19, 2022.

(30) Foreign Application Priority Data

Jan. 28, 2022 (EP) ..................................... 22153803

(51) Int. Cl.
*G06F 3/01* (2006.01)
*H05B 47/11* (2020.01)
*H05B 47/175* (2020.01)

(52) U.S. Cl.
CPC .............. *G06F 3/015* (2013.01); *H05B 47/11* (2020.01); *H05B 47/196* (2024.01)

(58) Field of Classification Search
CPC ........ G06F 3/015; H05B 46/11; H05B 47/196
(Continued)

(56) References Cited

U.S. PATENT DOCUMENTS

| 10,551,921 B2 | 2/2020 | Ramer et al. |
| 2015/0257700 A1* | 9/2015 | Fu ........................ A61B 5/7264 604/501 |

(Continued)

FOREIGN PATENT DOCUMENTS

| CN | 109164912 A | 1/2019 |
| EP | 3647976 A1 | 5/2020 |
| WO | 2021099544 A1 | 5/2021 |

OTHER PUBLICATIONS

Edlinger, Gunter, et al., "A Hybrid Brain-Computer Interface for Smart HME Control," J.A. Jacko (Ed.): Human-Computer Interaction, Part II, HCII 2011, LNCS 6762, Springer-Verlag Berlin Heidelberg, 2011 (10 Pages).

*Primary Examiner* — Calvin C Ma

(57) ABSTRACT

The brain control interface system comprises: a brain control interface configured to detect brain signals indicative of brain activity of a user in an environment, an input configured to obtain data indicative of a current light scene of one or more lighting devices in the environment, a memory configured to store processing methods associated with different light scenes, one or more processor configured to: select, from the processing methods stored in the memory, a processing method in accordance with the current light
(Continued)

scene, apply the selected processing method to obtain and/or process the brain signals, derive a control command and/or a mental state of the user from the brain signals, and control the controllable device based on the derived control command and/or the derived mental state.

14 Claims, 3 Drawing Sheets

(58) Field of Classification Search
USPC .......................................................... 345/156
See application file for complete search history.

(56) References Cited

U.S. PATENT DOCUMENTS

| | | |
|---|---|---|
| 2021/0022219 A1 | 1/2021 | Li |
| 2021/0267539 A1* | 9/2021 | Grant ...................... A61B 5/369 |
| 2023/0031100 A1* | 2/2023 | Ofer ........................ G06F 3/015 |
| 2025/0057488 A1* | 2/2025 | Faizan ................... A61B 5/165 |

* cited by examiner

BRAIN CONTROL INTERFACE SYSTEM FOR CONTROLLING A CONTROLLABLE DEVICE

CROSS-REFERENCE TO PRIOR APPLICATIONS

This application is the U.S. National Phase application under 35 U.S.C. § 371 of International Application No. PCT/EP2023/050724, filed on Jan. 13, 2023, which claims the benefit of U.S. Provisional Patent Application No. 63/300,753, filed on Jan. 19, 2022 and European Patent Application No. 22153803.6, filed on Jan. 28, 2022. These applications are hereby incorporated by reference herein.

FIELD OF THE INVENTION

The invention relates to a brain control interface system for controlling a controllable device. The invention further relates to a method of controlling a controllable device and to a computer program for executing the method.

BACKGROUND

Brainwave-based device control is a rising new technology. A brain-computer-interface (BCI) is used to detect brain signals of a user, whereupon information from these brain signals is derived. This information may, for example, be indicative of a thought, a mental state (e.g. happy, relaxed, concentrated, neutral) or an action of the user. The thought may, for example, be indicative of a control command for a controllable device, such as a lighting device. An example of such as system is disclosed in U.S. Pat. No. 10,551,921B2. There are two main types of BCIs: non-invasive and invasive BCIs. The non-invasive versions are the most common, and comprise sensors (electrodes) placed on the human head. These measure brain activity and translate that data to a computer. Most BCIs utilize electroencephalography (EEG) systems, which typically feature electrodes are attached to the scalp, which measure the electrical current sent by the neurons inside the brain. Changes in this electrical current reflect brain activity, because when an individual performs an action or thinks about something, hundreds of thousands of neurons are fired. This generates the electrical current, which is large enough to be measured on the scalp. A computer system then tries to make sense of this data to derive the user's action or thought. Alternatives to EEG systems are electrooculography (EOG), electromyography (EMG), electrodermal activity (EDA) and photoplethysmography (PPG) systems. As alternative to utilizing electrodes on the surface of the scalp, implantable brain-computer interfaces may be used. Here, probes are inserted into the brain through an automated process performed by a surgical robot. Each probe comprises an area of wires that contains electrodes capable of locating electrical signals in the brain, and a sensory area where the wire interacts with an electronic system that allows amplification and acquisition of brain signals.

Over the past several decades, neuroscientists have tried to decode the functionalities of different brain regions. For instance, it has been established that the occipital lobe is responsible for visual processing while the prefrontal cortex is responsible for problem-solving. Therefore, while a person is performing different activities during the day, different brain regions will be activated based on the skill that is required for a specific activity. For instance, when an individual passively views a presentation, the occipital lobe will be more involved as compared when a test is to be performed, which requires active problem-solving, and where the prefrontal cortex is used.

A research study (Min et al.—*Bright Illumination Reduces parietal EEG alpha activity during a sustained attention task. Brain Research,* 2013) conducted several experiments of sustained attention on subjects under different illumination conditions. EEG was recorded from the parietal region of the brain. The study found that brain pulses were significantly influenced by the illuminance factor. Their mean values indicate that high illuminance resulted in significantly longer latencies than low illuminance. The study concluded that the illumination condition substantially influences the attentional processing as reflected in the significant modulations of EEG activity.

A related study (Figueiro et al.—*Preliminary evidence that both blue and red light can induce alertness at night. BMC Neuroscience* 2009; 10: 105-105) shows that both short-wavelength and long-wavelength light increase alertness at night, as shown in EEG power change. Additionally, 10 lx of red light is also found to significantly affect the EEG measures compared to preceding dark conditions. In another study (Plitnick et al—*The effects of red and blue light on alertness and mood at night. Lighting Research and Technology* 2010; 42: 449-458), two levels (10 lx and 40 lx) of blue and red lights were both found to increase EEG beta power.

In a related study (Lin, Jing et al—*Effect of long-wavelength light on electroencephalogram and subjective alertness, Lighting Research and Technology,* 2020 Jan. 5, Vol. 52) it was investigated how exposures to long-wavelength lights of two different levels (40 lx and 160 lx) affect objective alertness (as measured by EEG). A significant effect of light levels on EEG beta (13-30 Hz) power was observed. Exposure to both 40 lx and 160 lx long-wavelength lights significantly increased beta power compared to the Dim condition.

In a related study (Ackeren et al.—*A (blue) light in the dark: Blue light modulates oscillatory alpha activity in the occipital cortex of totally visually blind individuals with intact non-visual photoreception*), three participants who were visually blind but had intact non-visual responses, were subjected to an on-off patterns of blue light. The study concluded that the blue light impacts the occipital region of the brain and decreases the power of the alpha EEG rhythm in this specific part of the brain.

EP 3647976 A1 discloses a method which includes: displaying dynamic information for login to a user; receiving an EEG signal that is generated by the user based on the displayed dynamic information and that is monitored by a monitoring device; matching the monitored EEG signal with an EEG signal that corresponds to the dynamic information in a login authentication library, where EEG signals generated by users based on various dynamic information are stored in the login authentication library; and logging in when the monitored EEG signal successfully matches the EEG signal that corresponds to the dynamic information in the login authentication library. The method further includes: monitoring a current environment to determine whether the current environment affects normal generation of the EEG and displaying the dynamic information for login to the user when the current environment does not affect the normal generation of the EEG.

SUMMARY OF THE INVENTION

The inventors have realized that light effects, for instance effects that include substantial amounts of blue light, bright light or dynamics, may compromise brainwave-based device control when utilizing the occipital brain region. As a result, a BCI may look at brainwaves in different regions of the brain, but these brainwaves may not reflect the correct cues for control of a device, because the resulting brainwaves may be affected by illumination (e.g. brainwaves are attenuated or amplified). This may result in false or incorrect triggers. It is therefore an object of the present invention to provide a brain control interface system that reduces the chance of false/incorrect triggers.

According to a first aspect of the present invention, the object is achieved by a brain control interface system for controlling a controllable device, the brain control interface system comprising:

a brain control interface configured to detect brain signals indicative of brain activity of a user in an environment,
an input interface configured to obtain data indicative of a current light scene of one or more lighting devices in the environment, wherein the current light scene defines currently active light settings according to which the one or more lighting devices are controlled,
a memory configured to store processing methods associated with different light scenes, one or more processor configured to:
determine the current light scene of one or more lighting devices (112, 114) based on the obtained data,
select, from the processing methods stored in the memory, a processing method in accordance with the current light scene,
apply the selected processing method to obtain and/or process the brain signals,
derive a control command and/or a mental state of the user from the brain signals, and
control the controllable device based on the derived control command and/or the derived mental state.

The one or more processors select a processing method (e.g. a processing instruction) for processing to obtain and/or process the brain signals. This selection is based on the currently active light scene in the environment, also defined as the current light scene. The memory, from which the processing method is selected, is configured to store associations between light scenes and processing methods for processing and/or obtaining the brain signals of the user. The current light scene may be one of said these light scenes. The one or more processors may compare the current light scene to the light scenes in the memory and select a processing method from the memory based on the comparison, wherein the selected corresponds processing method is associated with the current light scene. The current light scene may be defined as the (currently active) light settings according to which the one or more lighting devices are controlled. The light settings may define the properties of the output of the one or more lighting devices. Such properties include but are not limited to hue, saturation, brightness, flicker, temporal light artifacts, beam direction, transitions etc. Control of the one or more lighting devices results in the generation of one or more light effect(s) in the environment (e.g. a (part of) a room). Since the light effects provided by the one or more lighting devices affect the brain signals, it is beneficial to select an appropriate processing method for processing/ obtaining the brain signals. As a result, the brain control interface system reduces the chance of false/incorrect triggers.

The processing methods may be associated with different brain regions, and the one or more processors may be configured to obtain the brain signals from a brain region associated with the selected processing method. The different brain regions may comprise at least two of the temporal lobe, the orbitofrontal cortex and the visual occipital region, and wherein the one or more processors may be configured to select the brain region to obtain the brain signals from based on the current light scene. The one or more processors may be further configured to select two or more brain regions based on the current light scene. Certain light effects impact certain regions of the brain. For instance, blue light impacts the occipital region of the brain and decreases the power of the alpha EEG rhythm in this part of the brain. It is therefore beneficial to select, based on the current light scene, a processing method that is associated with a specific brain region to obtain the brain signals from that specific brain region.

The processing methods may be associated with different baselines, and the one or more processors may be configured to process the brain signals by applying a baseline associated with the selected processing method. When brain signals are analyzed, for instance by a head-mounted consumer brain-computer-interface (BCI), a baseline is typically used. The baseline can be considered as reference brain signals that are present when there's low/minimal brain activity of the user, for instance when the user is not providing a brain-control command to switch on the light. Alternatively, the baseline can be considered as reference brain signals that are present when there's constant brain activity of the user, for instance when the user is reading a book or meditating. The BCI may effectively analyze the delta between the measured brain signals and the baseline to for instance deduce whether the user has issued the BCI command for switching on a ceiling lighting unit. It is beneficial to process the brain signals by applying a baseline associated with the selected processing method, because this improves the brain signal detection.

The one or more processors may be further configured to obtain a user identifier of the user, and select the processing method further based on the identity of the user. Different users may require different processing methods for obtaining and/or processing brain signals. Hence, it is beneficial to select a processing method further based on the user's identity.

The light scene may be a dynamic light scene that changes over time, wherein the dynamic light scene has a dynamics level, and the one or more processors may be configured to select the processing method based on the dynamics level. The level of dynamics may be defined by the amount of change of properties of the light output of the one or more lighting devices within a time period. The properties of the light output may include but are not limited to: hue, saturation, brightness, flicker, beam direction, etc. Dynamic effects, and more specifically dynamic effects with higher dynamics levels, may affect the brain signals. Selecting the processing method based on the dynamics level thus reduces the chance of false/incorrect triggers.

The one or more processors may be configured to determine a color of the currently active light settings of the light scene, and to select the processing method based on the color. Certain colors affect the brain signals. For instance, the blue light impacts the occipital region of the brain and decreases the power of the alpha EEG rhythm in this specific part of the brain. Selecting the processing method based on the color thus reduces the chance of false/incorrect triggers.

The controllable device may be a lighting device of the one or more lighting devices. Alternatively, the controllable device may, for example, be a connected (home) appliance or connected (office) equipment.

The input interface may be configured to obtain the data indicative of the current light scene by obtaining sensor data from a light sensor (located in the environment). In aspects, alternatively, the brain control interface system may comprise said light sensor. Said light sensor may alternatively be a camera. For example, the brain control interface system may comprise such a light sensor or camera for rendering sensor data indicative of the current light scene, or for determining the current light scene.

Alternatively, the input interface may be a receiver configured to receive the data indicative of the current light scene from a lighting system controller. The lighting system controller may, for example, be a central (home) lighting control system, a bridge, a smartphone, etc.

The one or more processors may be further configured to determine if light properties of a further light scene of the one or more lighting devices in the environment exceed a threshold, and to, if the light properties of the further light scene exceed the threshold, refrain from obtaining and/or processing the brain signals. The one or more processors may thus be further configured to refrain from obtaining and/or processing the brain signals if the (further) light scene would affect the obtaining and/or processing the brain signals too much (i.e. when the light properties of the light scene exceed the threshold).

The one or more processors may be further configured to analyze the brain signals to identify a level of noise in the brain signals when the current light scene is active, and, if the level of noise exceeds a first threshold, adjust the light scene. It may be beneficial to adjust the light scene because this may reduce the level of noise, which reduces the chance of false/incorrect triggers.

According to a second aspect of the present invention, the object is achieved by a method of controlling a controllable device, the method comprising:
  detecting, by a brain control interface, brain signals indicative of brain activity of a user in an environment,
  obtaining data indicative of a current light scene of one or more lighting devices in the environment, wherein the current light scene defines currently active light settings according to which the one or more lighting devices are controlled,
  determine the current light scene of one or more lighting devices (112, 114) based on the obtained data,
  selecting, from processing methods stored in a memory, the processing methods being associated with different light scenes, a processing method in accordance with the current light scene,
  applying the selected processing method to obtain and/or process the brain signals,
  deriving a control command and/or a mental state of the user from the brain signals, and
  controlling the controllable device based on the derived control command and/or the mental state.

According to a third aspect of the present invention, the object is achieved by a computer program product for a computing device, the computer program product comprising computer program code to perform the method when the computer program product is run on a processing unit of the computing device.

According to a fourth aspect of the present invention, the object is achieved by a system comprising a brain control interface system, according to any of the above-mentioned brain control interface systems, and the controllable device configured to be controlled by the brain control interface system. The system may be a lighting system and the controllable device may be a lighting device.

It should be understood that the method and the computer program product may have similar and/or identical embodiments and advantages as the above-mentioned brain control interface systems.

In the context of the present invention, the term "light scene" relates to lighting control instructions/light settings for one or more lighting devices. The lighting control instructions may be the same for each lighting device, or be different for different lighting devices. The lighting control instructions may relate to one or more light settings, which may for instance be defined as RGB/HSL/HSB color values, CIE color values, brightness values, etc.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
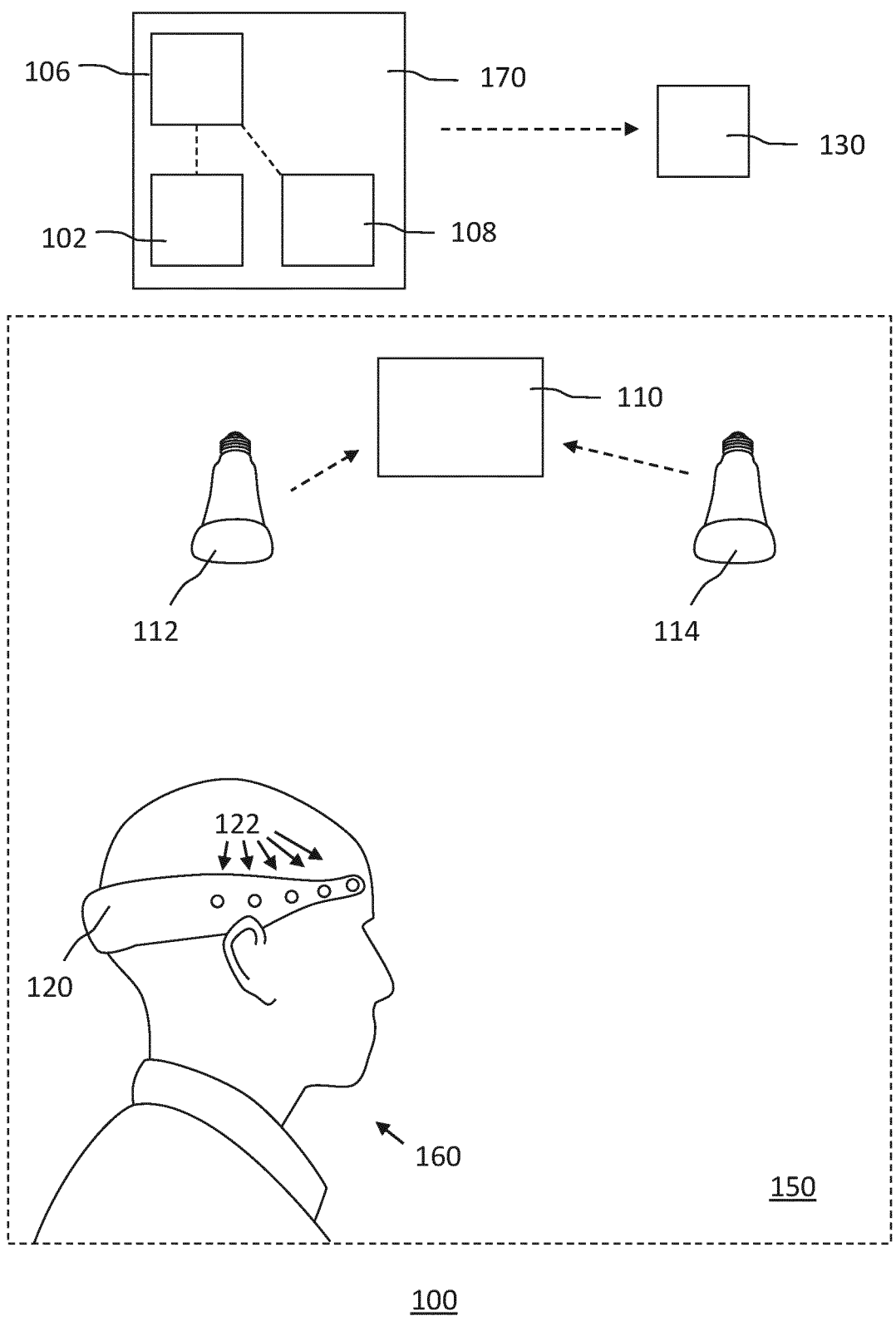
FIG. 1 shows schematically an example of a brain control interface system for controlling a controllable device.

FIG. 1 shows schematically an overview of a brain control interface system 100. The brain control interface system 100 comprises a brain control interface 120 (e.g. a head-worn device, a wrist worn device for detecting brain pulses to the user's hand, etc.). The brain control interface 120 (BCI) is configured to detect brain signals indicative of brain activity of a user 160 in an environment 150. One or more processors 106 are configured to derive a control command and/or a mental state of the user from the detected brain signals. The BCI 120 may comprise one or more electrodes 122 in contact with the user's scalp, which electrodes 122 are used for detecting EEG signals of the user. It should be understood that such a BCI 120 is an example, and that other types of brain signal detection may be used.

The brain control interface system 100 further comprises an input interface 102 configured to obtain data indicative of a current light scene of one or more lighting devices 112, 114 in the environment 150. The input interface 102 may be an input to the one or more processors 106 configured to obtain the data indicative of the current light scene of one or more lighting devices 112, 114 from a memory, for instance memory 108. Alternatively, the input interface 102 may be configured to obtain the data indicative of the current light scene by obtaining sensor data from a light sensor located in the environment 150. Alternatively, the input interface 102 may be a receiver configured to (wirelessly) receive the data indicative of the current light scene, for instance from a lighting control system 110 such as a central home/office control system, from a remote lighting control system connected to the one or more lighting devices via the cloud, etc. The lighting control system 110 may be configured to control the one or more lighting devices 112, 114 by communicating lighting control signals to the one or more lighting devices 112, 114 (e.g. via Zigbee, BLE, Ethernet, etc.) to generate the light scene. The control signals comprise light settings indicative of light output properties (for example hue, saturation, brightness, beam direction, etc.). The one or more lighting devices 112, 114 are configured to receive the control signals and a driver is configured to adjust the light output of one or more (LED) light sources accordingly.

The brain control interface system 100 further comprises a memory 108 configured to store processing methods associated with different light scenes. The memory 108 may be a local memory or a remote memory accessible via a network. The memory 108 may be configured to store a look-up table comprising lighting information associated with respective processing methods for processing and/or obtaining brain signals detected by the brain control interface 120.

The brain control interface system 100 further comprises one or more processors 106 (e.g. circuitry, one or more microcontrollers, etc.). The one or more processors 106 are configured to obtain data indicative of the brain signals as detected by the BCI 120. The one or more processors 106 may be comprised in a single device or distributed across multiple devices, which may depend on the system architecture of the BCI system 100.

In the example of FIG. 1, the one or more processors 106, the memory 108 and the input interface 102 are comprised in a single device 170, which device is communicatively coupled with the lighting controller 110, the BCI 120 and the controllable device 130. It should be understood that this system architecture is merely an example, and that the skilled person is able to design alternative system architectures without departing from the scope of the appended claims. For instance, a first processor of the one or more processors 106 may be comprised in the BCI 120, and a second processor on a remote server or in the lighting controller 110. In another example, the one or more processors 106, the memory 108 and the input interface may be comprised in the lighting controller 110. In another example, a first processor of the one or more processors 106 may be comprised in a remote server and a second processor in the lighting controller 110. In yet another example, one or more of the system components 102, 106, 108 may be comprised in the BCI 120, or in the controllable device 130.

The one or more processors 106 are configured to select, from the processing methods stored in the memory 108, a processing method in accordance with the current (active) light scene. The one or more processors 106 obtain the data indicative of the current light scene via the input interface 102 (e.g. directly from the lighting devices 112, 114, or indirectly via the lighting controller 110). The one or more processors 106 may access the memory 108 to access a look-up table comprising lighting information associated with respective processing methods for processing and/or obtaining brain signals detected by the brain control interface 120. The one or more processors 106 may compare lighting information (e.g. color, brightness, level of dynamics, etc.) of the current light scene to the lighting information stored in the memory, and select a processing method from the memory based on the comparison. For instance, if the current light scene causes the lighting devices 112, 114 to output cool white light (e.g. 5000-7000 Kelvin), the one or more processors 106 may access the memory 108 and select a processing method that corresponds to this light output. The processing method may, for example, be associated with a specific brain region (e.g. the orbitofrontal cortex) comprising instructions to obtain the brain signals from that specific brain region. Similarly, a specific subset of brain regions may be selected of which the brain signals are obtained and/or used. In another example the processing method may, for example, be associated with a specific baseline (e.g. a reference (pre-stimulus) interval or a threshold level for detecting control commands for the controllable device) to be used for processing the brain signals. In another example the processing method may, for example, be associated with a specific algorithm to be used for processing the brain signals.

The one or more processors 106 are further configured to apply the selected processing method to obtain and/or process the brain signals, and derive a control command and/or a mental state of the user for controlling the controllable device 130. The one or more processors 106 may, for example, compare an obtained set of brain signals to a plurality of predetermined sets of brain signals, wherein each set may comprise brain signals from different electrodes. The predetermined sets may be stored in a memory, for instance memory 108. Each predetermined set may be associated with a control command for the controllable device 130, and the one or more processors 106 may select a control command based on the comparison, for instance by determining that a level of similarity between the obtained set of brain signals and a predetermined set does not exceed a threshold. Techniques for deriving control commands for a controllable device 130 from brain signals are known in the art and will therefore not be discussed in further detail. The one or more processors 106 may, for example, compare an obtained set of brain signals to a plurality of predetermined sets of brain signals, wherein each set may comprise brain signals from different electrodes. The predetermined sets may be stored in a memory, for instance memory 108. Each predetermined set may be associated with a mental state of the user (e.g. calm, aroused, etc.), which in turn may be associated with a control command for controlling the controllable device 130, and the one or more processors 106 may select a control command associated with the derived mental state based on the comparison, for instance by determining that a level of similarity between the obtained set of brain signals and a predetermined set does not exceed a threshold. Techniques for deriving mental states from brain signals are known in the art and will therefore not be discussed in further detail.

Figure 2A:
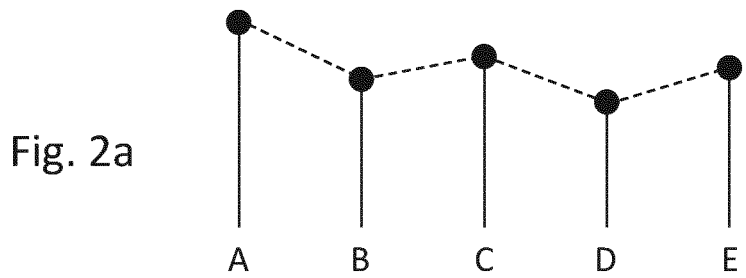
FIG. 2a shows schematically an example of a set of brain signals indicative of a control command.
Figure 2B:
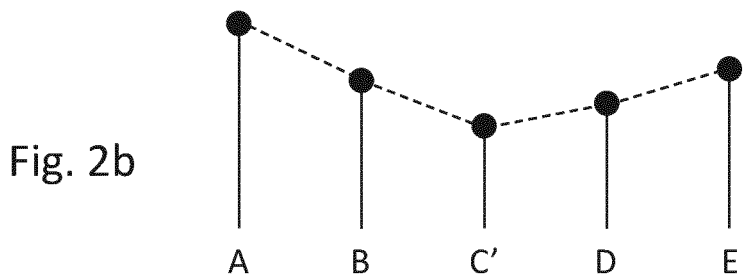
FIG. 2b shows schematically an example of the set of brain signals of FIG. 2a affected by illumination.

FIGS. 2a-2e show how brain signals may be misinterpreted due to illumination in the environment 150, and how to correct for such misinterpretation. FIG. 2a shows an example of a set of brain signals indicative of a control command. Letters A-E indicate different brain regions, and the length of the bars indicates the level of (change in) brain activity for the different brain regions. Each brain signal may correspond to an electrode positioned on the user's scalp. Typically, when a user would provide the control command as illustrated in FIG. 2a, the different brain signals A-E would correspond to the values indicated in FIG. 2a. It may, however, occur that the illumination in the environment 150 affects the brain activity of a user. FIG. 2b illustrates an example wherein the user tries to provide the control command as defined in FIG. 2a. However, the illumination in the environment 150 may affect a certain region of the brain (e.g. the occipital region, which brain signals may be detected by the electrode that provides brain signals C).

Figure 2C:
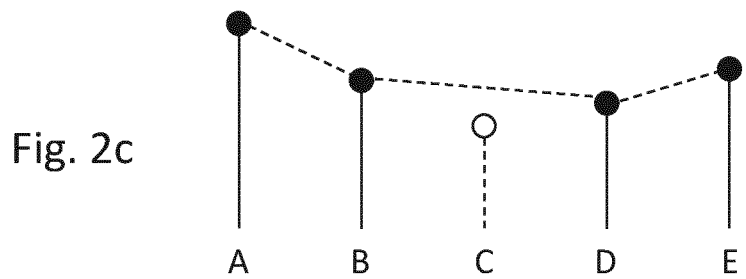
FIG. 2c-e show schematically examples of interpreting the set of brain signals of FIG. 2b to derive a control command from the set of brain signals.
Figure 2D:
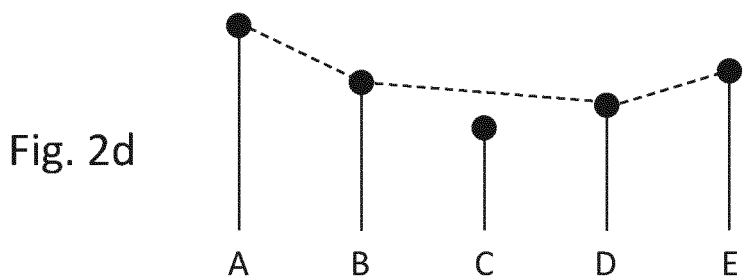
Figure 2E:
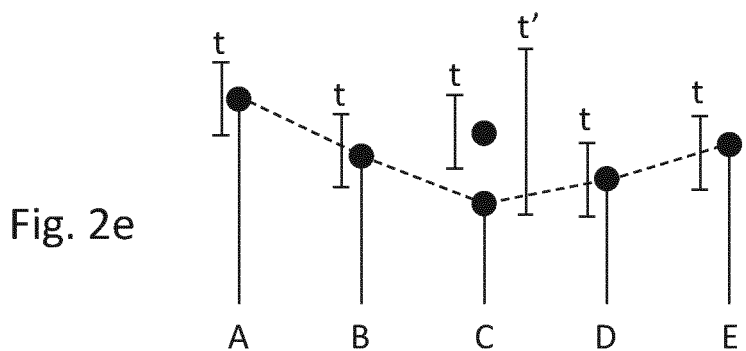

Consequently, the set of brain signals A-E would not correspond to the set of brain signals of FIG. 2*a*, but to those of FIG. 2*b*, wherein the brain signal C' is substantially different from brain signal C. FIGS. 2*c-e* show examples of correcting the misinterpretation by selecting a processing method based on the illumination (the current light scene of the lighting devices 112, 114).

FIG. 2*c* shows an example for correcting the misinterpretation of the brain signals A-E of FIG. 2*b* by selecting a processing method wherein the brain signal C is not obtained by the BCI. The one or more processors 106 may inform the BCI to refrain from obtaining brain signals from the brain region that corresponds to brain signal C. As a result, the one or more processors 106 may correctly derive the control command (as defined by the brain signals A-E of FIG. 2*a*) for the controllable device 130 from the brain signals A, B, D and E of FIG. 2*c*.

FIG. 2*d* shows another example for correcting the misinterpretation of the brain signals A-E of FIG. 2*b* by selecting a processing method wherein the brain signal C is excluded from analysis to determine if the set of brain signals A-E of FIG. 2*d* correspond to the brain signals A-E of FIG. 2*a*. As a result, the one or more processors 106 may correctly derive the control command for the controllable device 130 from the brain signals A-E of FIG. 2*d*.

FIG. 2*e* shows another example for correcting the misinterpretation of the brain signals A-E of FIG. 2*b* by selecting a processing method wherein the threshold for brain signal C being correct (for detecting the control command) is increased. FIG. 2*e* shows original thresholds t for each of the brain signals A-E (which original thresholds may be all the same or may be different for the different brain regions). As shown in FIG. 2*e*, original threshold t of brain signal C may be increased to threshold t'. As a result, brain signal C of FIG. 2*e* falls within the threshold t' and the one or more processor 106 may derive the control command for the controllable device 130 from the brain signals A-E of FIG. 2*e*.

In these examples, the brain signals indicative are indicative of a control command. Similarly, the brain signals may be indicative of the user's mental state, and the processing method may be selected in a similar fashion. The processor 106 may then select a command for controlling the controllable device 130 based on the user's mental state.

The one or more processors 106 are further configured to control the controllable device 130 based on the derived control command, for instance by communicating the control command to the controllable device 130 via a (wireless) network. The controllable device 130 may for example be a connected (home) appliance (e.g. a lighting device, a tv, an audio system, blinds, an HVAC system, etc.) or connected (office) equipment (e.g. office lighting, a display, a projector, etc.). It should be understood that these are examples of controllable devices 130, and that the skilled person is able to design alternatives without departing from the scope of the appended claims.

The processing methods may be associated with different brain regions, and the one or more processors 106 may be configured to obtain the brain signals from a brain region associated with the selected processing method. In the example of FIG. 2*c*, the processing method may be associated with brain regions A, B, D, E, and thereby instruct the BCI to obtain the brain signals these brain regions (and thereby exclude brain region C).

The processing methods may be associated with different noise filtering methods/algorithms, and the one or more processors 106 may be configured to apply a noise filtering method/algorithm associated with the selected processing method. Certain light scenes may affect the level of noise. It is therefore beneficial to select a noise filtering method/algorithm based on the current light scene.

The processing methods may be associated with different baselines, and the one or more processors 106 may be configured to process the brain signals by applying a baseline associated with the selected processing method. When brain signals are analyzed, for instance by a brain-computer-interface (BCI), a baseline is typically used. The baseline can be considered as reference brain signals that are present when there's low/minimal brain activity of the user, for instance when the user is not providing a brain-control command to switch on the light. Alternatively, the baseline can be considered as reference brain signals that are present when there's constant brain activity of the user, for instance when the user is reading a book or meditating. The BCI may effectively analyze the delta between the measured brain signals and the baseline to for instance deduce whether the user has issued the BCI command for switching on a ceiling lighting unit. It is beneficial to process the brain signals by applying a baseline associated with the selected processing method, because this improves the brain signal detection.

The one or more processors may be further configured to obtain a user identifier of the user, and select the processing method further based on the identity of the user. Different users may require different processing methods for obtaining and/or processing brain signals. The user identifier may be obtained from a database storing user identifiers. The user identifier may, for example, be received from the BCI 120, from the lighting controller 110, the controllable device 130, etc.

The light scene may be a dynamic light scene that changes over time. The dynamic light scene may have a dynamics level, and the one or more processors 106 may be configured to select the processing method based on the dynamics level. The dynamics level may be defined by the amount of change of properties of the light output of the one or more lighting devices within a time period. The properties of the light output may include but are not limited to: hue, saturation, brightness, flicker, beam direction, etc. Dynamic effects, and more specifically dynamic effects with higher dynamics levels, may affect the brain signals. The one or more processors 106 may for example select a processing method that excludes a certain brain region or a processing method that adjusts the thresholds for brain signals (e.g. brain signals of certain regions) to obtain and/or process the detected brain signals.

The one or more processors 106 may be configured to determine a color (or a plurality of colors) of the light scene. The one or more processors 106 select the processing method based on the color. Certain colors of illumination affect the brain signals different from other colors. For instance, the blue light impacts the occipital region of the brain and decreases the power of the alpha EEG rhythm in this specific part of the brain. The one or more processors 106 may therefore select a specific processing method (e.g. one of the processing methods illustrated in FIGS. 2*c*-2*e*).

The one or more processors 106 may be further configured to determine if light properties of a further light scene of the one or more lighting devices in the environment exceed a threshold, and to, if the light properties of the further light scene exceed the threshold, refrain from obtaining and/or processing the brain signals. The one or more processors may thus be further configured to refrain from obtaining and/or processing the brain signals if the (further) light scene would affect the obtaining and/or processing the brain signals too much (i.e. when the light properties of the light scene exceed the threshold). The further light scene is a light scene different from the current light scene, and may be active at a different moment in time than the current light scene. The further light scene may, for example, a dynamic light scene with a dynamics level that would cause incorrect brain signal interpretation.

The one or more processors 106 may be further configured to analyze the brain signals to identify a level of noise in the brain signals when the current light scene is active, and, if the level of noise exceeds a first threshold, adjust the light scene. The one or more processors 106 may, for example, control the one or more lighting devices 112, 114 according to a light scene that improves the detection of brain signals. For instance, the lighting devices 112, 114 may be controlled according to a white light scene with a spectrum that corresponds to daylight, or according to a dynamic light scene with a low dynamics level.

Figure 3:
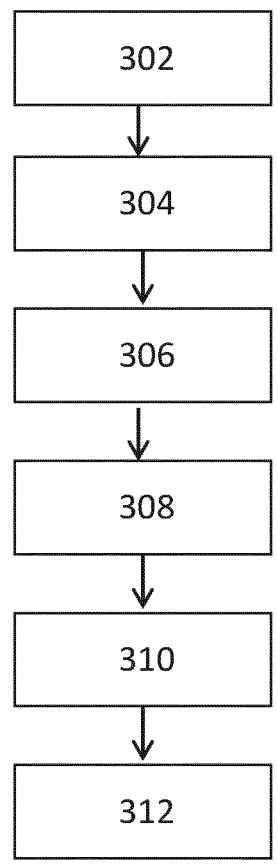
FIG. 3 shows schematically an example of a method of controlling a controllable device.

FIG. 3 illustrates an example of a method 300 of controlling a controllable device. the method 300 comprises: detecting 302, by a brain control interface, brain signals indicative of brain activity of a user in an environment, obtaining 304 data indicative of a current light scene of one or more lighting devices in the environment, selecting 306, from processing methods stored in a memory, the processing methods being associated with different light scenes, a processing method in accordance with the current light scene, applying 308 the selected processing method to obtain and/or process the brain signals, 310 deriving a control command from the brain signals, and 312 controlling the controllable device based on the derived control command.

The method 300 may be executed by computer program code of a computer program product when the computer program product is run on a processing unit of a computing device, such as by one or more processing units of the respective components of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins).

Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A brain control interface system for controlling a controllable device, the brain control interface system comprising:
   a brain control interface configured to detect brain signals indicative of brain activity of a user in an environment,
   an input interface configured to obtain data indicative of a current light scene of one or more lighting devices in the environment, wherein the current light scene is defined as the currently active light settings according to which the one or more lighting devices are controlled,
   a memory configured to store processing methods associated with different light scenes,
   one or more processors configured to:
      determine the current light scene of one or more lighting devices based on the obtained data,
      select, from the processing methods stored in the memory, a processing method in accordance with the current light scene,
      apply the selected processing method to obtain and/or process the brain signals,
      derive a control command and/or a mental state of the user from the brain signals obtained and/or processed by the applied selected processing method,
      control the controllable device based on the derived control command and/or the derived mental state, and
      analyze the brain signals to identify a level of noise in the brain signals when the current light scene is active, and when the level of noise exceeds a first threshold, adjust the light scene so as to reduce the level of noise to reduce the change of incorrect triggers.

2. The brain control interface system of claim 1, wherein the processing methods are associated with different brain regions, and wherein the one or more processors are configured to obtain the brain signals from a brain region associated with the selected processing method.

3. The brain control interface system of claim 2, wherein the different brain regions comprise at least two of the temporal lobe, the orbitofrontal cortex and the visual occipital region, and wherein the one or more processors are configured to select the brain region to obtain the brain signals from based on the current light scene.

4. The brain control interface system of claim 1, wherein the processing methods are associated with different baselines, wherein the different baselines comprise different reference brain signals, and wherein the one or more processors are configured to process the brain signals by applying a baseline associated with the selected processing method.

5. The brain control interface system of claim 1, wherein the one or more processors are further configured to obtain a user identifier of the user, and to select the processing method further based on the identity of the user.

6. The brain control interface system of claim 1, wherein the light scene is a dynamic light scene that changes over time, wherein the dynamic light scene has a dynamics level, and wherein the one or more processors are configured to select the processing method based on the dynamics level.

7. The brain control interface system of claim 6, wherein the dynamics level is indicative of a level of change of the light scene within a time period.

8. The brain control interface system of claim 1, wherein the one or more processors are configured to determine a color of the current light scene, and to select the processing method based on the color.

9. The brain control interface system of claim 1, wherein the controllable device is a lighting device of the one or more lighting devices.

10. The brain control interface system of claim 1, wherein the input interface is configured to obtain the data indicative of the current light scene by obtaining sensor data from a light sensor.

11. The brain control interface system of claim 1, wherein the input interface is a receiver configured to receive the data indicative of the current light scene from a lighting system controller.

12. The brain control interface system of claim 1, wherein the one or more processors are further configured to determine if light properties of a further light scene being active at a different moment in time of the one or more lighting devices in the environment exceed a threshold, and to, if the light properties of the further light scene exceed the threshold, refrain from obtaining and/or processing the brain signals.

13. A method of controlling a controllable device, the method comprising:
  detecting, by a brain control interface, brain signals indicative of brain activity of a user in an environment,
  obtaining data indicative of a current light scene of one or more lighting devices in the environment, wherein the current light scene is defined as the currently active light settings according to which the one or more lighting devices are controlled,
  determine the current light scene of one or more lighting devices based on the obtained data,
  selecting, from processing methods stored in a memory, the processing methods being associated with different light scenes, a processing method in accordance with the current light scene,
  applying the selected processing method to obtain and/or process the brain signals,
  deriving a control command and/or a mental state of the user from the brain signals obtained and/or processed by the applied selected processing method,
  controlling the controllable device based on the derived control command and/or the derived mental state, and
  analyzing the brain signals to identify a level of noise in the brain signals when the current light scene is active, and when the level of noise exceeds a first threshold, adjust the light scene so as to reduce the level of noise to reduce the chance of incorrect triggers.

14. A non-transitory computer readable medium comprising computer program code to perform the method of claim 13 when run on one or more processors.

* * * * *